US006337058B1

(12) United States Patent
Williams et al.

(10) Patent No.: US 6,337,058 B1
(45) Date of Patent: Jan. 8, 2002

(54) PROCESS FOR PRODUCING CALCIUM SULFIDE

(75) Inventors: Charles A. Williams; Ernest H. Williams, both of Summerville, SC (US)

(73) Assignee: E&C Williams Inc., Summerville, SC (US)

( * ) Notice: Subject to any disclaimer, the term of this patent is extended or adjusted under 35 U.S.C. 154(b) by 0 days.

(21) Appl. No.: 08/714,638

(22) Filed: Sep. 16, 1996

(51) Int. Cl.$^7$ .......................... C22B 26/20; B22B 27/24
(52) U.S. Cl. .................... 423/168; 423/566.3; 423/638; 422/137; 422/229; 422/233
(58) Field of Search .............................. 423/566.3, 168, 423/638; 422/137, 229, 233

(56) References Cited

U.S. PATENT DOCUMENTS

| | | | |
|---|---|---|---|
| 616,391 A | * 12/1898 | Baranoff | |
| 2,717,825 A | * 9/1955 | Greenwalt | 422/229 |
| 3,729,551 A | * 4/1973 | Gorin | 423/168 |
| 3,917,795 A | * 11/1975 | Pelczarski et al. | 423/168 |
| 4,060,588 A | * 11/1977 | Mandelak | 423/566.3 |
| 4,226,630 A | 10/1980 | Styron | 106/85 |
| 4,348,299 A | 9/1982 | Okamoto et al. | 252/301.4 |
| 4,388,066 A | * 6/1983 | Natarajan et al. | 432/1 |
| 4,427,637 A | * 1/1984 | Iwashita et al. | 422/173 |
| 4,501,618 A | 2/1985 | Gebhard et al. | 106/109 |
| 4,580,973 A | * 4/1986 | Mansperger et al. | 432/194 |
| 4,629,509 A | 12/1986 | O'Hara et al. | 106/118 |
| 4,744,969 A | * 5/1988 | Marten et al. | 423/168 |

FOREIGN PATENT DOCUMENTS

| | | | |
|---|---|---|---|
| CA | 2137996 | 5/1996 | |
| GB | 759259 | * 10/1956 | 423/171 |

OTHER PUBLICATIONS

Encyclopedia of Chemical Technology 3rd Edition, vol. 22, pp. 1,2, 91, 92, and 105.
Narrow Fabric Weaving, Hans Walter Kipp, Brochure. Six (6) pages, 1989.

* cited by examiner

Primary Examiner—Gary P. Straub

(57) ABSTRACT

A process and apparatus for producing calcium sulfide is provided comprising a container housing one or more drums, each drum having a substantially horizontal longitudinal center axis and containing one or more screw conveyors therein. Multiple drums are connected by passageways, and passages are provided for passing material into and out of the container and the drum(s). A heater is provided for supplying heat to the material within the drum(s). The process comprises passing the reactants, gypsum and charcoal, into the container and drum(s), heating the reactants within the drum(s) thereby initiating a chemical reaction converting reactants to products (including calcium sulfide), moving the reactants and products substantially horizontally in the drum(s) through the use of the screw conveyor(s) contained therein, and passing the products out of the drum(s) and the container.

8 Claims, 3 Drawing Sheets

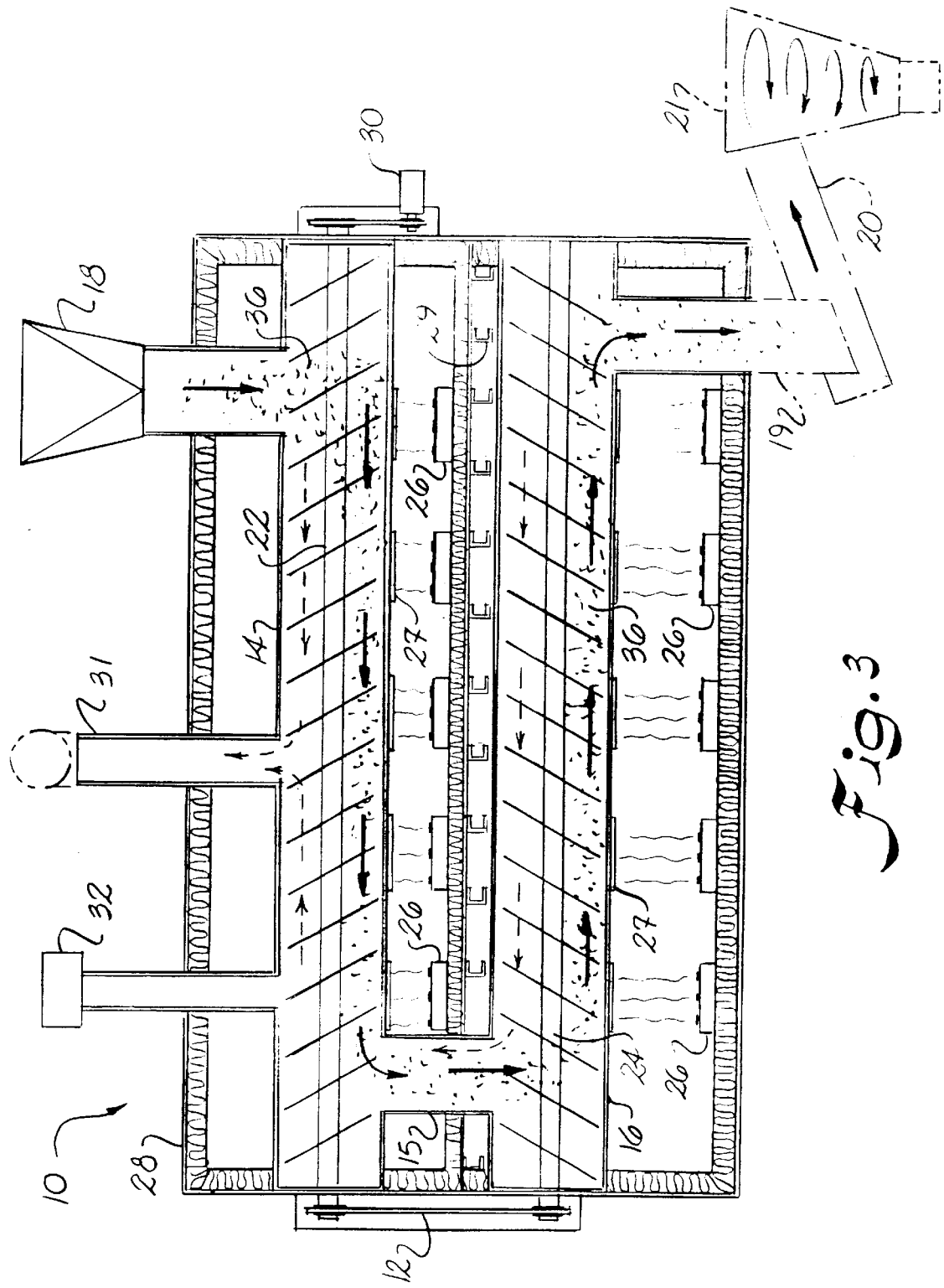

PROCESS FOR PRODUCING CALCIUM SULFIDE

BACKGROUND OF THE INVENTION

This invention relates generally to the art of producing an inorganic sulfide, and more specifically to an improved process and apparatus for producing calcium sulfide and the calcium sulfide produced by the process.

A variety of laboratory processes exist for producing calcium sulfide. U.S. Pat. No. 4,348,299 discloses a laboratory process for producing calcium sulfide which involves heating a mixture of an oxidic material, such as carbonate, oxide, or an oxalate of calcium, with a reactive sulfurizing flux in a covered crucible in air at temperatures between 800° and 1200° C. for a time between 0.2 and 72 hours. U.S. Pat. No. 4,629,509 involves the addition of dry lime and an aqueous solution of an inorganic salt supplying sulfide (the combination resulting in calcium sulfide) to a solid residue in order to immobilize the residue.

Although the prior art devices may be suitable for their intended purposes, there is much room for improvement in the art of producing calcium sulfide.

SUMMARY OF THE INVENTION

It is therefore an object of this invention to provide an improved process and apparatus for producing calcium sulfide.

It is another object of this invention to provide calcium sulfide produced by the improved process and apparatus according to this invention.

It is another object of this invention to provide an improved process and apparatus that produces calcium sulfide economically.

It is yet another object of this invention to provide an improved process and apparatus that produces calcium sulfide in commercial quantities.

It is yet another object of this invention to provide an improved process and apparatus for producing calcium sulfide that can be set up and operated without difficulty.

These and other objects of the invention are achieved by a container housing at least one drum, the drum(s) having a substantially horizontal longitudinal center axis, wherein the drum(s) contain at least one screw conveyor substantially therein, the screw conveyor(s) being generally parallel to the horizontal center axis, an inlet passage for passing material into the container and drum(s), an outlet passage for passing material out of the drum(s) and container, and a heater for heating material within the drum(s); whereby reactants can be passed into the container and drum(s), wherein the reactants can be heated up within the drum(s) thereby substantially initiating a chemical reaction, the chemical reaction substantially converting reactants into products, wherein the reactants and products can be caused to move substantially horizontally in the drum(s) by the turning action of the screw conveyor(s), and wherein the products can be passed out of the drum(s) and container.

BRIEF DESCRIPTION OF THE DRAWINGS

FIG. 3 is an elevational view illustrating a preferred embodiment of the apparatus used in producing calcium sulfide according to the present invention.

DETAILED DESCRIPTION

According to this invention, it has been found that a process and apparatus for economically producing calcium sulfide in commercial amounts can be utilized. This and other features of the invention will become apparent from the description that follows with reference to the various figures of drawing.

Although calcium sulfide has been produced in the past, the prior processes have been limited to a laboratory scale. One major reason for this is the high cost involved in producing this compound utilizing the prior art devices. Thus, there have been no processes for producing calcium sulfide which will operate on a commercial scale. Consequently, companies which use calcium sulfide to stabilize heavy metals in soil and for other purposes have traditionally had trouble obtaining calcium sulfide in the amounts they require. Also, while the prior art may be concerned with producing relatively pure calcium sulfide, uses exist for calcium sulfide in concentrations of 45–50%.

Figure 1:
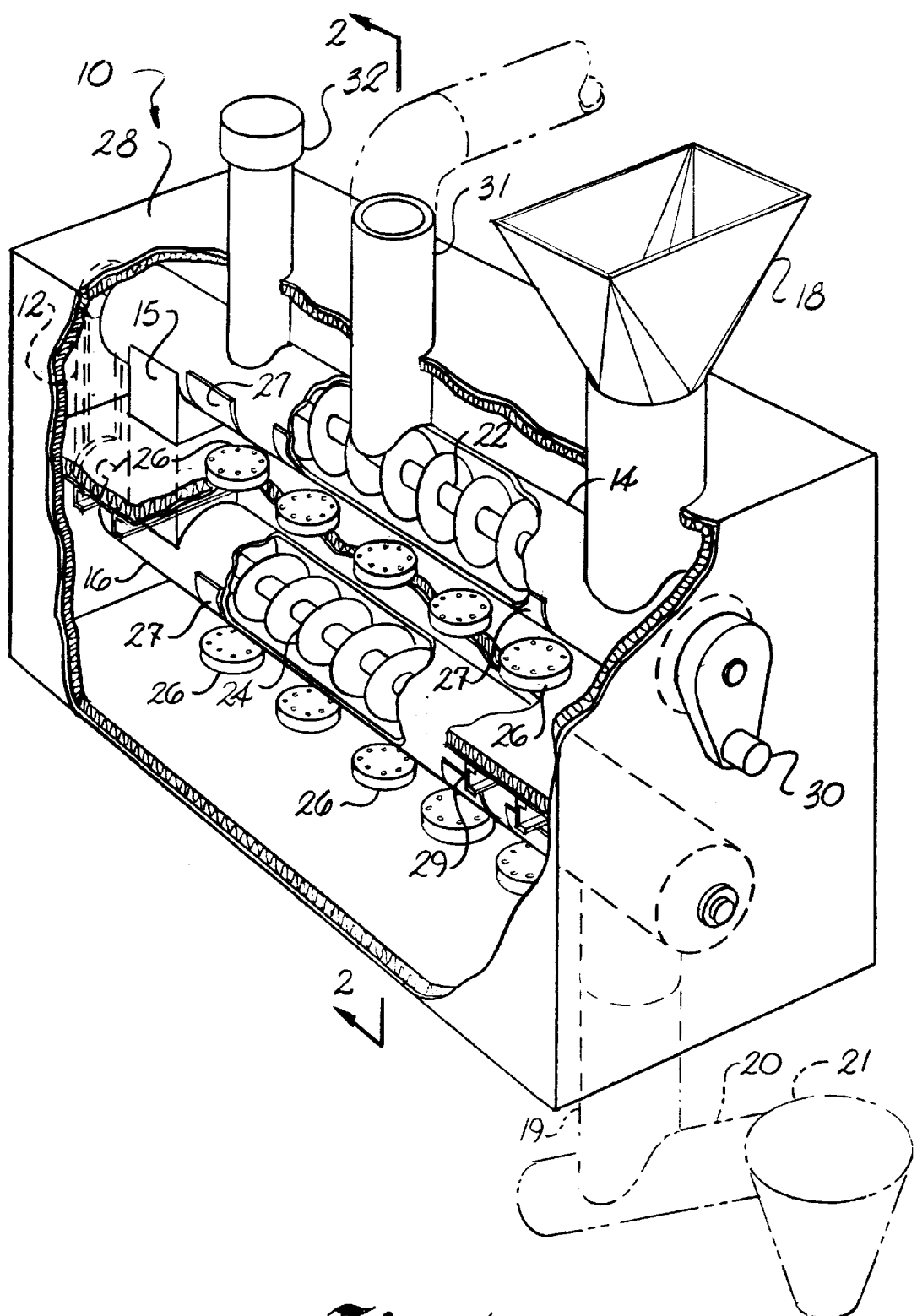
FIG. 1 is a perspective view in partial cutaway illustrating a preferred embodiment of the apparatus used in producing calcium sulfide according to the present invention.

Referring to the drawings, FIG. 1 illustrates the preferred embodiment of the apparatus used in producing calcium sulfide according to the present invention. Apparatus 10 comprises container 12, which houses a first drum 14 and a second drum 16 used in transforming the reactants of gypsum and charcoal into products including calcium sulfide. The calcium sulfide produced is typically in powder form. Although two drums are preferred, utilizing one central drum is acceptable. Additionally, coal may be used in place of charcoal; however, better results have been obtained using charcoal. Carbon may also be used in place of charcoal. The use of carbon is advantageous because carbon can often be obtained cheaply and easily. Also, the heating of carbon produces significantly less gaseous emissions than does the heating of charcoal.

It is believed that the gypsum, or anhydrous calcium sulfate, is reduced to calcium sulfide when it is heated with charcoal. Several byproducts may also be formed, including calcium oxide and water. The basic chemical reaction thought to be occurring during this transformation of reactants to products is shown below.

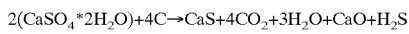

$$2(CaSO_4 \cdot 2H_2O) + 4C \rightarrow CaS + 4CO_2 + 3H_2O + CaO + H_2S$$

The amounts of calcium sulfide and calcium oxide produced are roughly equal. While this is believed to be the reaction by which the above-stated reactants are being transformed to the above-stated products, other mechanisms may be present. Calcium phosphate and calcium carbonate can be mixed with the calcium sulfide upon its removal from container 12 for uses such as heavy metal stabilization. If desired, the calcium oxide can be mixed with these compounds as well.

The present invention produces calcium sulfide in concentrations of about 45–50%, sufficient for uses such as the stabilization of heavy metals in soil. The process and apparatus of the present invention can easily produce 7000 tons of calcium sulfide per year, and does so economically. As discussed above, this has not been possible with the prior art devices.

FIGS. 1 and 3 illustrate a preferred embodiment of the apparatus used in producing calcium sulfide according to the present invention. As shown in the figures, apparatus 10 comprises container 12. Housed within container 12 are a first drum 14 and a second drum 16, both of which have a generally horizontal longitudinal center axis. An inlet passage 18 extends into container 12 and connects with first drum 14. Inlet passage 18 is used for passing reactants from a conveyor into first drum 14. An outlet passage 19, connected to second drum 16, extends out of container 12 and is used for passing products out of container 12. A passageway 15 connects first drum 14 and second drum 16, thus allowing material to flow between them. First drum 14, second drum 16, and passageway 15 are preferably made from stainless steel.

Figure 2:
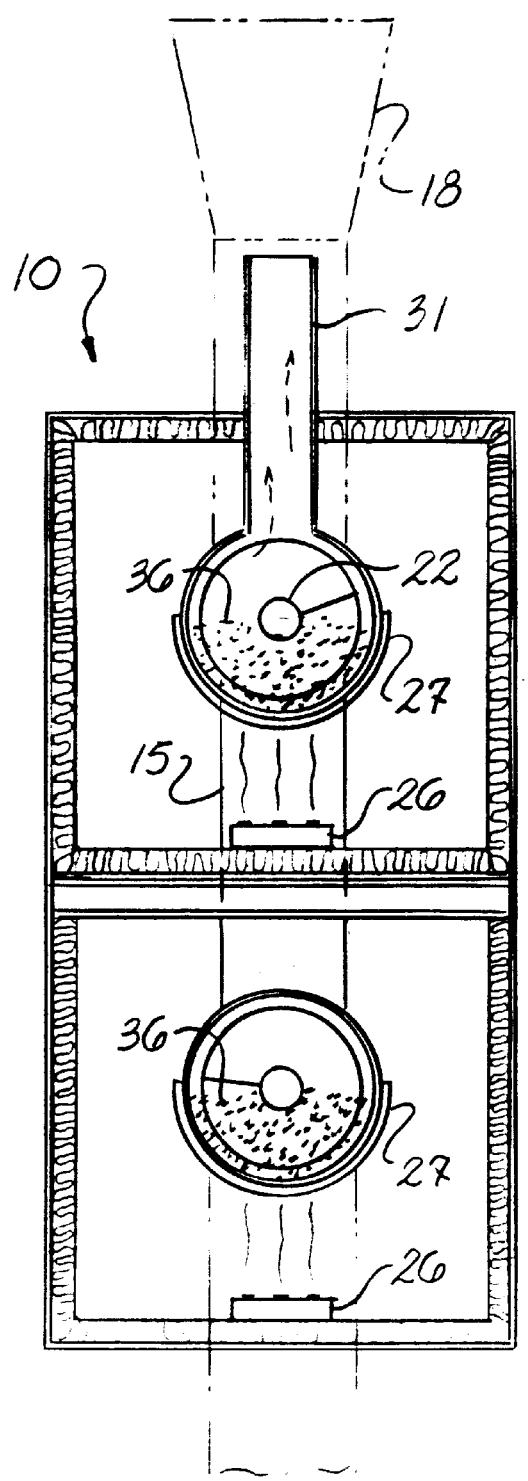
FIG. 2 is a cross-sectional view taken along line 2—2 of FIG. 1 illustrating a preferred embodiment of the apparatus used in producing calcium sulfide according to the present invention.

Heaters 26 are provided to heat up the material within drums 14 and 16, which is usually a combination of reactants and products depending on the location. Heaters 26 can be heating elements, such as heating coils or burners, proximate drums 14 and 16 which can be activated to supply heat. Heaters 26 can also be passages supplying a heating medium, such as steam or pressurized gas, to the inside of container 12 proximate drums 14 and 16. In a preferred embodiment of the present invention, five burners are provided below second drum 16 and four burners are provided below first drum 14 (as illustrated in FIG. 2). Heat shields 27 are attached to the bottom of drums 14 and 16 directly above the burners. Heat shields 27 are used to extend the useful life of the drums by preventing the flame from being in direct contact with the drums.

Insulation 28 is provided to cover the interior walls of containers 12. A piece of insulation 28 runs generally horizontally through the center of container 12 between drums 14 and 16 for dividing the container into two distinct sections. Insulation 28 serves to maintain heat within container 12 and proximate drums 14 and 16. Consequently, less heat from heaters 26 is required to carry out the chemical reaction. Insulation 28 and the upper burners rest on supports 29, which are fixedly attached to at least two walls of container 12.

The heat supplied by heaters 26 comes into contact with the exterior of drums 14 and 16. The heat is transferred through the walls of drums 14 and 16 to the material inside. For best results, heaters 26 should supply heat in an amount to obtain a temperature of 1800–2000° F. in container 12. As discussed above, it is believed that this heating of the reactants causes the chemical reaction which substantially converts reactants to products. The pressure in drums 14 and 16 is about two or three psig.

First drum 14 and second drum 16 contain screw conveyors 22 and 24, respectively, housed substantially therein. Screw conveyors 22 and 24 run generally parallel to the horizontal longitudinal center axis of drums 14 and 16. In the preferred embodiment, screw conveyors 22 and 24 are located in the center of drums 14 and 16 and have a mechanical connection extending out of drums 14 and 16 and container 12. Using one central screw conveyor in each drum is preferred; however, using two or more strategically placed screw conveyors in each drum is acceptable. The turning action of screw conveyors 22 and 24 impart a driving force to move material substantially horizontally down drums 14 and 16. The turning of screw conveyors 22 and 24 is controlled by pump 30, which can any suitable conventional pump. As the material is being moved horizontally, it is also being rotated circularly around screw conveyors 22 and 24, thereby mixing the material. It is believed that this mixing also aids in the conversion of reactants to products. Screw conveyors 22 and 24 are preferably made from stainless steel.

For purposes of understanding scale, it is preferred that container 12, drums 14 and 16, and screw conveyors 22 and 24 are all approximately 30 feet long. Thus, apparatus 10 is large enough to produce significant volumes of calcium sulfide, yet small enough to be set up in any location of choice.

Box exhaust line 31 communicates with drum 14 and is provided to allow for the escape of pressurized gases, such as water vapor and black smoke resulting from the burning of charcoal, to the surroundings. Box exhaust line 31 is opened for short periods of time by automatic means (not-shown) for allowing the pressurized gases to escape. Box exhaust line 31 can be connected to one or two cyclone-type separators. Such separators serve to "clean" gaseous streams, thereby preventing undesirable emissions from being vented to the atmosphere. As mentioned earlier, if carbon is employed as a reactant instead of charcoal, gaseous emissions will be low and separators will not be necessary.

Pressure discharge line 32 communicates with first drum 14 and ensures that the pressure in drum 14 does not reach such a level at which an explosion may occur. Pressure discharge line opens automatically when the pressure within first drum 14 reaches a certain level, and closes when the pressure within first drum 14 returns to normal. The pressure within first drum 14 can be monitored by an exterior pressure gauge (not-shown) connected thereto.

In the preferred embodiment of the process and apparatus for producing calcium sulfide according to this invention, gypsum and charcoal (the reactants) are fed from a conveyor into inlet passage 18. The reactants are preferably premixed and in the form of powder being less than 100 mesh. Upon entering inlet passage 18, the reactants fall into first drum 14. Heaters 26 provides heat in such an amount as to obtain a temperature of 1800–2000° F. in container 12, to which the reactants are immediately exposed upon entering first drum 14. Once the reactants have entered first drum 14, they are moved substantially horizontally down first drum 14 by the turning action of screw conveyor 22. During this time, the reactants are continuously being heated and converted to calcium sulfide and other byproducts as discussed above. As also discussed above, pressurized gases are allowed to escape first drum 14 via box exhaust line 31, and pressure discharge line 32 ensures that the pressure in drum 14 does not reach such a level at which an explosion may occur.

Once the material approaches the end of first drum 14, it is transferred to second drum 16 by gravity via passageway 15. Screw conveyor 24, located substantially within second drum 16, moves the material substantially horizontally down second drum 16 in the opposite direction as it was being moved in first drum 14. Screw conveyor 24 is substantially identical in structure and function to screw conveyor 22, with the above-stated exception of rotating in the opposite direction. While in second drum 16, the material is still being heated by heaters 26, and the reactants continue to undergo transformation to products. The products and any remaining reactants are allowed to exit second drum 16 and container 12 through outlet passage 19. The point of connection between container 12 and outlet passage 19 is opened periodically for allowing products to exit container 12. The products are then preferably pumped by a screw (not-shown) up inclined pipe 20, and dropped into small, cone-shaped tank 21. From cone-shaped tank 21, the products can be dropped out and collected in containers suitable for shipping or storage. As mentioned earlier, the calcium sulfide and calcium oxide can be mixed with other compounds such as calcium phosphate and calcium carbonate upon removal from apparatus 10.

FIG. 2 is a cross-sectional view taken along line 2—2 of FIG. 1. As shown in FIG. 2, the amount of raw materials added to first drum 14 should be enough to where both first drum 14 and second drum 16 are filled about one-half way (to level 36) during steady state operation. This level is beneficial because it allows room for expansion within drums 14 and 16. Expansion of the material can occur during the chemical reaction described earlier, and as much as one foot of expansion has been observed during operation. Furthermore, this level inherently provides safer operating conditions, i.e., providing more space for pressurized gases to occupy.

It is thus seen that an improved process and apparatus for producing calcium sulfide can be utilized. It is also seen that the improved process and apparatus for producing calcium sulfide according to this invention economically produces calcium sulfide in commercial quantities. It is also seen that the improved process and apparatus for producing calcium sulfide according to this invention can be set up and operated without difficulty.

It is understood that many variations will become apparent to one of ordinary skill in the art upon reading the specification. Such variations are within the spirit and scope of this invention as defined by the following appended claims.

That which is claimed:

1. A process for producing calcium sulfide and calcium oxide comprising the steps of:

providing a container housing having two drums, said drums each having a horizontal longitudinal center axis, said drums being connected by a passageway therebetween, wherein each of said drums contains a screw conveyor that extends continuously for the full length of the respective drum, said screw conveyor being generally parallel to the respective said horizontal center axis of said respective drum;

providing an inlet passage for passing material into said drums;

providing an outlet passage for passing material out of said drums;

providing indirect heat to said materials within said drums;

passing reactants comprising (i) a source of calcium sulfate and (ii) a source of carbon selected from the group consisting of charcoal, coal, and carbon into the first one of said two drums;

supplying heat to said reactants in said first one of said two drums to dehydrate said reactants;

passing said reactants to a second one of said two drums and maintaining the temperature of the atmosphere exterior to said second one of said two drums between 1800 and 2000° F.;

converting said reactants to CaS and CaO within said second one of said two drums;

moving said reactants and said products with said screw conveyors contained within said two drums; and passing said products out of said drums and said container, said product comprising calcium sulfide and calcium oxide.

2. The process according to claim 1 wherein said step of passing reactants into said container comprises passing gypsum and charcoal into said container.

3. The process according to claim 1 wherein the pressure in said two drums is maintained at about two to three psig.

4. The process according to claim 1 wherein said step of supplying heat to said reactants comprises supplying combustion gases proximate said two drums.

5. The process according to claim 1 wherein said step of supplying heat to said reactants comprises passing steam generally upwards and around said two drums.

6. The process according to claim 1 wherein said step of supplying heat to said reactants further comprises passing hot pressurized gas generally upwards and around said two drums.

7. The process according to claim 1 wherein said two drums are filled to about one-half of the capacity of said two drums.

8. The process of claim 1 wherein said product comprises 45–50% calcium sulfide.

* * * * *